(12) United States Patent
Carley et al.

(10) Patent No.: US 7,730,487 B2
(45) Date of Patent: Jun. 1, 2010

(54) SYNCHRONIZING TRANSACTION AMBIENT STATE AMONG MULTIPLE TRANSACTION MANAGERS

(75) Inventors: William James Carley, Woodinville, WA (US); James Ernest Johnson, Bellevue, WA (US); John David Doty, Seattle, WA (US); Jonathan Morell Cargille, Bellevue, WA (US); Kapil Gupta, Redmond, WA (US); Max A. Feingold, Bellevue, WA (US); Michael R. Clark, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1305 days.

(21) Appl. No.: 11/204,209

(22) Filed: Aug. 15, 2005

(65) Prior Publication Data

US 2007/0038650 A1    Feb. 15, 2007

(51) Int. Cl.
G06F 9/46 (2006.01)
(52) U.S. Cl. ............... 718/101; 719/313; 719/320; 707/8
(58) Field of Classification Search ................ 707/103; 719/313
See application file for complete search history.

(56) References Cited

U.S. PATENT DOCUMENTS

| | | | | |
|---|---|---|---|---|
| 6,009,405 | A * | 12/1999 | Leymann et al. | 705/9 |
| 6,138,169 | A * | 10/2000 | Freund et al. | 719/313 |
| 6,157,927 | A * | 12/2000 | Schaefer et al. | 707/103 R |
| 7,103,597 | B2 * | 9/2006 | McGoveran | 707/8 |
| 7,430,740 | B1 * | 9/2008 | Molloy et al. | 718/101 |
| 2005/0144301 | A1 * | 6/2005 | Park et al. | 709/230 |

* cited by examiner

Primary Examiner—Diem K Cao
(74) Attorney, Agent, or Firm—Workman Nydegger

(57) ABSTRACT

The present invention extends to methods, systems, and computer program products for synchronizing ambient state among multiple transaction managers. A coordinating transaction manager establishes transaction ambient state for an application initiated transaction. The coordinating transaction manager sends and a subordinate transaction manager receives a pointer to an ambient state delegate. The subordinate transaction manager sends a request to invoke the ambient state delegate to the coordinating transaction manager in response to receiving an operation. The coordinating transaction manager invokes the ambient state delegate to format the transaction ambient state for the subordinate transaction manager. The coordinating transaction manager sends and the subordinate transaction manager receives the formatted transaction ambient state such that the subordinate transaction manager can appropriately process the operation within the scope of the transaction. The subordinate transaction manager utilizes the formatted transaction ambient state to appropriately process the operation within the scope of the transaction.

19 Claims, 3 Drawing Sheets

SYNCHRONIZING TRANSACTION AMBIENT STATE AMONG MULTIPLE TRANSACTION MANAGERS

CROSS-REFERENCE TO RELATED APPLICATIONS

Not applicable.

BACKGROUND OF THE INVENTION

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, transaction processing, Web browsing, and printing documents) include the exchange of electronic messages between a number of computer systems and/or other electronic devices via wired and/or wireless computer networks.

A feature of most, if not all, transaction processing systems is what is commonly referred to as a two-phase commit protocol. A two-phase commit protocol enables a number of different components (as part of the same transaction) to do some processing and agree on an outcome. The two-phase commit protocol also enables different components to be returned to their pre-transaction state when some error conditions occur. Since, a single transaction can update many different components (e.g., databases), the two-phase commit protocol strategy is designed to ensure that either all the components are updated or none of them, so that the components remain consistent. That is, the two-phase commit protocol attempts to maintain the atomicity of transactions by executing transactions in two phases, a prepare phase and a commit phase.

In a prepare phase, a transaction manager identifies what resources are necessary to a transaction and what components should be contacted to access the necessary resources. The transaction manager then attempts to contact the components by sending a prepare message requesting that the components commit to performing an operation on the necessary resource according to the transaction.

Components that are in a state (or that subsequently transition into a state) capable of performing operations requested in a prepare message, indicate this capability back to the transaction manager by sending a prepare complete message to the transaction coordinator. A prepare complete message further indicates that a component will remain in a state capable of applying the requested operations even if the component subsequently fails. However, if any component does not respond or responds that it is not capable of performing operations according to the transaction, the transaction manager may abort the transaction.

In a commit phase (after a prepare phase is successful), the transaction manager sends a commit message to all components participating in the transaction (i.e., any component from which the transaction coordinator received a prepare complete message). Reception of a commit message causes a component to perform any operations that were indicated as being prepared in a previously corresponding prepare complete message. After a component successfully performs the indicated operations, the component sends a commit complete message back to the transaction manager.

Use of a transaction manager results in sole ownership of a transaction environment and a single decision maker for decisions related to the transaction. Accordingly, there is a single concept of a transaction, a single concept of an environment, and a single concept of a thread of control. This singular control over a transaction promotes a consistent transaction meaning for the lifetime of the transaction.

Unfortunately, using of a single transaction manager is not always the most efficient way to process transactions. For example, distributing the processing of different portions of a transaction across different federated transaction managers can result in performance gains relative to processing a transaction at single transaction manager. Further, in some environments, use of different transaction managers may be required for various different portions of a transaction. For example, file systems operations may be required to be processed by a specialized file system transaction manager. Thus, when a transaction includes file system operations along with other types of operations, the file system operations are processed at the specialized file system transaction manager and the other operations are processed at a different general purpose transaction manager.

Thus, in these environments a global transaction can involve a federation of local transaction managers. However, due to the varied transaction manager configurations, different transaction managers in a federation can have different understandings of a transaction. For example, different transaction managers can have different understandings of how transactions are delimited (e.g., where a transaction starts and ends). Without some intervening processing, these different understandings of a transaction can lead to data inconsistencies or even prevent a transaction from occurring.

Some mechanisms that attempt to prevent or to compensate for different understandings of a transaction include a parent transaction manager informing subordinate resource managers that a transaction has begun, and is active or inactive. However, the parent transaction manager has no way to know beforehand what other transaction managers in a federation might process part of the transaction. Thus, to insure a common understanding across all transaction managers, the parent transaction manager informs all corresponding resource managers, even those resource managers that are not being used by a calling application. Accordingly, this mechanism is somewhat inefficient since resource managers that will have nothing to do with the transaction are informed of the transaction.

Other mechanisms that attempt to prevent or to compensate for different understandings of a transaction include resource managers enlisting with a parent transaction manager when provided with a transaction. These other mechanisms are more efficient since resource managers enlist with the parent transaction manager in response to being provided with a transaction. However, these other mechanisms do not allow the parent transaction manager to register with resources managers. Thus, when a resource manager receives a transaction, the relationship to the parent transaction manager must already be known.

Another potential solution is to develop applications that are capable of communicating directly with a variety of differently configured transaction managers. However, this potential solution requires a developer to code routines for communicating with various different transaction managers that may never be utilized. Further, if other differently configured transaction managers are created after application development is complete, the application may have no way to communicate with these other differently configured transaction managers. Thus, the developer may have to code additional routines for communicating with these other differently configured transaction managers. This type of repetitive and potentially unnecessary coding is timing consuming and burdensome to developers.

BRIEF SUMMARY OF THE INVENTION

The foregoing problems with the prior state of the art are overcome by the principles of the present invention, which are directed towards methods, systems, and computer program products for synchronizing ambient state among multiple transaction managers. A coordinating transaction manager establishes transaction ambient state for an application initiated transaction. The transaction ambient state is in a format that is compatible with the transaction manager. The coordinating transaction manager sends a pointer to an ambient state delegate to a subordinate transaction manager. The ambient state delegate provides the transaction ambient state in a format that is compatible with the subordinate transaction manager such that the application is relieved from having to provide transaction ambient state to the subordinate transaction manager.

The subordinate transaction manager receives the pointer to the ambient state delegate from the coordinating transaction manager. The subordinate transaction manager receives an operation that is part of the transaction. The subordinate transaction manager sends a request to invoke the ambient state delegate to the coordinating transaction manager in response to receiving the operation. The coordinating transaction manager receives the request to invoke the ambient state delegate from the other transaction manager.

The coordinating transaction manager invokes the ambient state delegate to format the transaction ambient state for the subordinate transaction manager. The coordinating transaction manager sends the formatted transaction ambient state to the subordinate transaction manager such that the subordinate transaction manager can appropriately process the operation within the scope of the transaction. The subordinate transaction manager receives the formatted transaction ambient state from the ambient state delegate. The subordinate transaction manager utilizes the formatted transaction ambient state to appropriately process the operation within the scope of the transaction.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
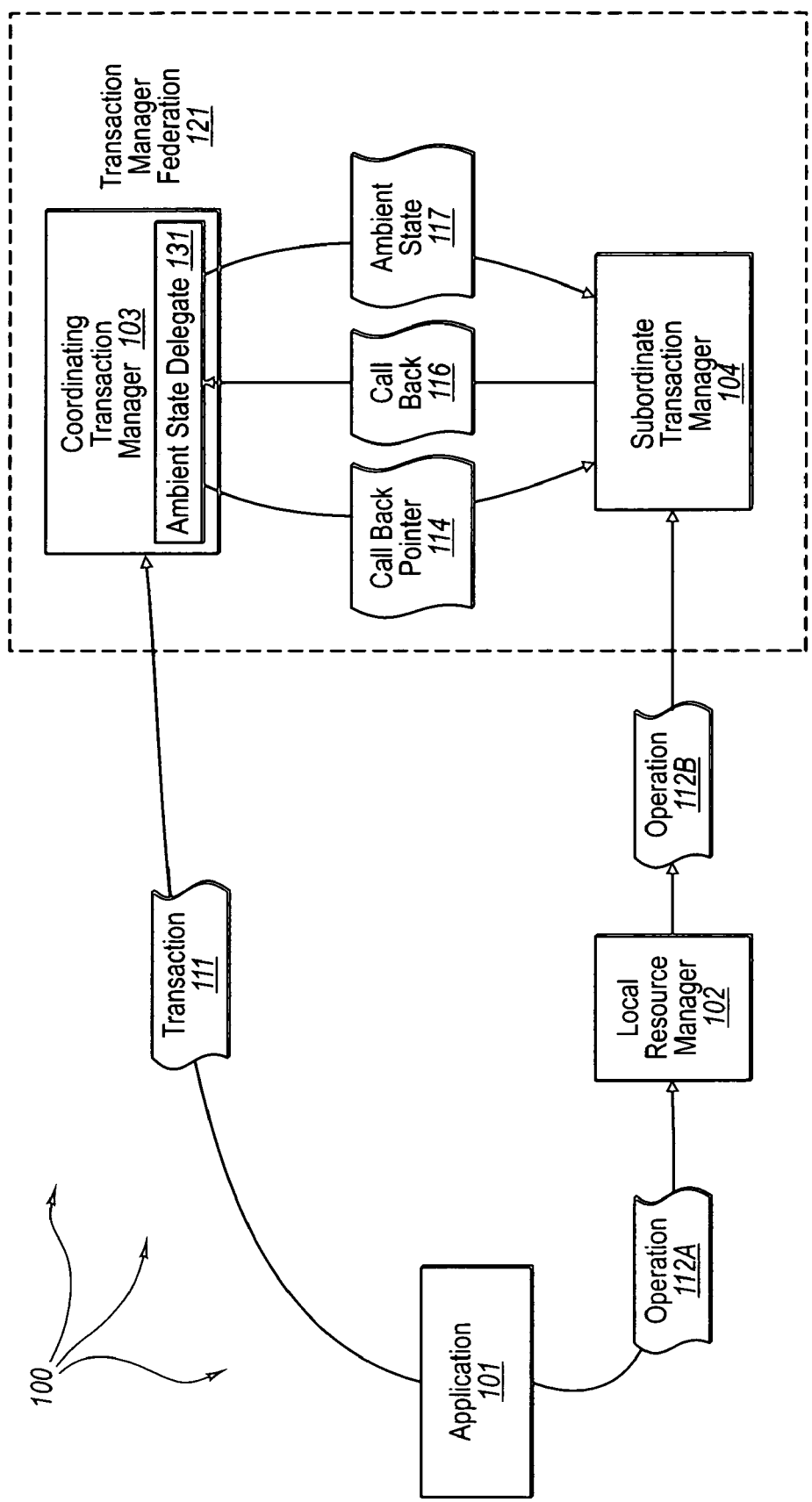
FIG. 1 illustrates an example of a computer architecture that facilitates synchronizing ambient state among multiple transaction managers.

The principles of the present invention provide for synchronizing ambient state among multiple transaction managers. A coordinating transaction manager establishes transaction ambient state for an application initiated transaction. The transaction ambient state is in a format that is compatible with the transaction manager. The coordinating transaction manager sends a pointer to an ambient state delegate to a subordinate transaction manager. The ambient state delegate provides the transaction ambient state in a format that is compatible with the subordinate transaction manager such that the application is relieved from having to provide transaction ambient state to the subordinate transaction manager.

The subordinate transaction manager receives the pointer to the ambient state delegate from the coordinating transaction manager. The subordinate transaction manager receives an operation that is part of the transaction. The subordinate transaction manager sends a request to invoke the ambient state delegate to the coordinating transaction manager in response to receiving the operation. The coordinating transaction manager receives the request to invoke the ambient state delegate from the other transaction manager.

The coordinating transaction manager invokes the ambient state delegate to format the transaction ambient state for the subordinate transaction manager. The coordinating transaction manager sends the formatted transaction ambient state to the subordinate transaction manager such that the subordinate transaction manager can appropriately process the operation within the scope of the transaction. The subordinate transaction manager receives the formatted transaction ambient state from the ambient state delegate. The subordinate transaction manager utilizes the formatted transaction ambient state to appropriately process the operation within the scope of the transaction.

Embodiments within the scope of the present invention include computer-readable media for carrying or having computer-executable instructions or data structures stored thereon. Computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Computer-executable instructions comprise, for example, instructions and data which cause a general-purpose computer system or special-purpose computer system to perform a certain function or group of functions. Computer executable instructions may be, for example, binaries, intermediate format instructions such as assembly language, or even source code.

In this description and in the following claims, a "network" is defined as one or more data links that enable the transport of electronic data between computer systems and/or modules. Local Area Networks ("LANs"), Wide Area Networks ("WANs") and the Internet are examples of networks.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates synchronizing ambient state among multiple transaction managers. Depicted in computer architecture 100 are application 101, local resource manager 102, coordinating transaction manager 104 and subordinate transaction manager 104. Application 101, local resource manager 102, coordinating transaction manager 104 and subordinate transaction manager 103 can all be components of the same computer system.

Alternately, one or more of Application 101, local resource manager 102, coordinating transaction manager 103 and subordinate transaction manager 104 can be separated from one another by a computer network, such as, for example, a Local Area Network ("LAN"), a Wide Area Network ("WAN"), or even the Internet, via various communication links. Thus, it may be that one or more of application 101, local resource manager 102, coordinating transaction manager 103 and subordinate transaction manager 104 communicate via network messaging. Accordingly, application 101, local resource manager 102, coordinating transaction manager 103 and subordinate transaction manager 104, as well as other connected components, can be configured to create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over a network.

Generally, application 101 can be configured to initiate transactions that include a plurality of different operations. As depicted in computer architecture 100, some operations (included in transaction 111) can be sent to coordinating transaction manager 103 and others (operation 112A) can be sent to local resource manager 102. Local resource manager 102 can (potential alter and) forward operations (e.g., operation 112B) to subordinate transaction manager 104 manager.

In some environments, one or more components of computer architecture 100 are not aware (have no knowledge of the existence) of one or more other components. For example, application 101 may not be aware of subordinate transaction manager 104. Similarly, local resource manager 102 may not be aware of coordinating transaction manager 103. Coordinating transaction manager 103 and subordinate transaction manager 104 may initially be unaware of one another. Through a subsequent transaction manager scanning or registration process, coordinating transaction manager 103 can identify subordinate transaction manager 104 or vice versa.

Coordinating transaction manager 103 and subordinate transaction manager 104 along with other identified transaction managers can be included in transaction manager federation 121.

Generally, coordinating transaction manager 103 is configured to manage a transaction. Some transactions can be distributed across multiple transaction managers. For example, portions of transaction 111 can be distributed across coordinating transaction manager 103 and subordinate transaction manager 104. Without intervening processing, transaction managers can have different understandings of a transaction. For example, coordinating transaction manager 103 and subordinate transaction 104 may have a different understanding of the boundaries of transaction 111 (e.g., how the beginning and end of transaction 111 is delimited).

To compensate for these different understandings, coordinating transaction manager 103 can present application program interfaces ("APIs") to other transaction managers such that the other transaction managers can obtain appropriately formatted transaction ambient state for a transaction. Thus, for example, subordinate transaction manager 104 can utilize the APIs to obtain coordinating transaction manager 103's understanding of transaction 111. Since coordinating transaction manager 103 provides appropriately formatted transaction ambient state to other transaction managers, application 101 is relieved from having to implement similar functionality.

More specifically, coordinating transaction manager 103 can include an API for registering a callback with a subordinate transaction manager. Subordinate transaction managers, such as, for example, subordinate transaction manager 104, can use the callback API to coordinate transactions with (e.g., synchronize transaction ambient state) coordinating transaction manager 103. During a transaction manager scanning or registration process, coordinating transaction manager 103 can provide a callback pointer (e.g., call back pointer 114) to a subordinate transaction manager.

The following source code is one example of a callback API providing a handle for entering a transaction scope:

```
// IN: oldHandle, current transaction handle
//
// IN: pvContext, blob for use by the transaction scope provider
//
// OUT: newHandle new transaction handle which will be set
//       as the current transaction handle
//
// return value is used to indicate success / failure
typedef BOOL (*TransactionScopeCallback) (
                            IN void*    pvContext,
                            IN HANDLE oldHandle,
                            OUT HANDLE* pnewHandle);
```

A subordinate transaction manager can then use the new handle to obtain appropriately formatted transaction ambient state. The entry callback API can include logic for binding a transaction scope to a transactional environment of the subordinate transaction manager. Coordinating transaction manager 103 can also include a similar callback API providing a handle for exiting a transaction scope. The exit callback API can include logic for popping the internal stack of a subordinate transaction manager and resetting the current transaction back to the one found when the enter transaction scope callback was provided.

Using the handles provided by entry and exit handle APIs, subordinate transaction managers can utilize other APIs to enter and exit transaction scopes. The other APIs can include logic for formatting transaction ambient state into a format that is compatible with a calling subordinate transaction manager (e.g., subordinate transaction manager 104). APIs can be included in an ambient state delegate, such as, for example, ambient state legate 131, configured to provide transaction ambient state to subordinate transaction managers.

Figure 2:
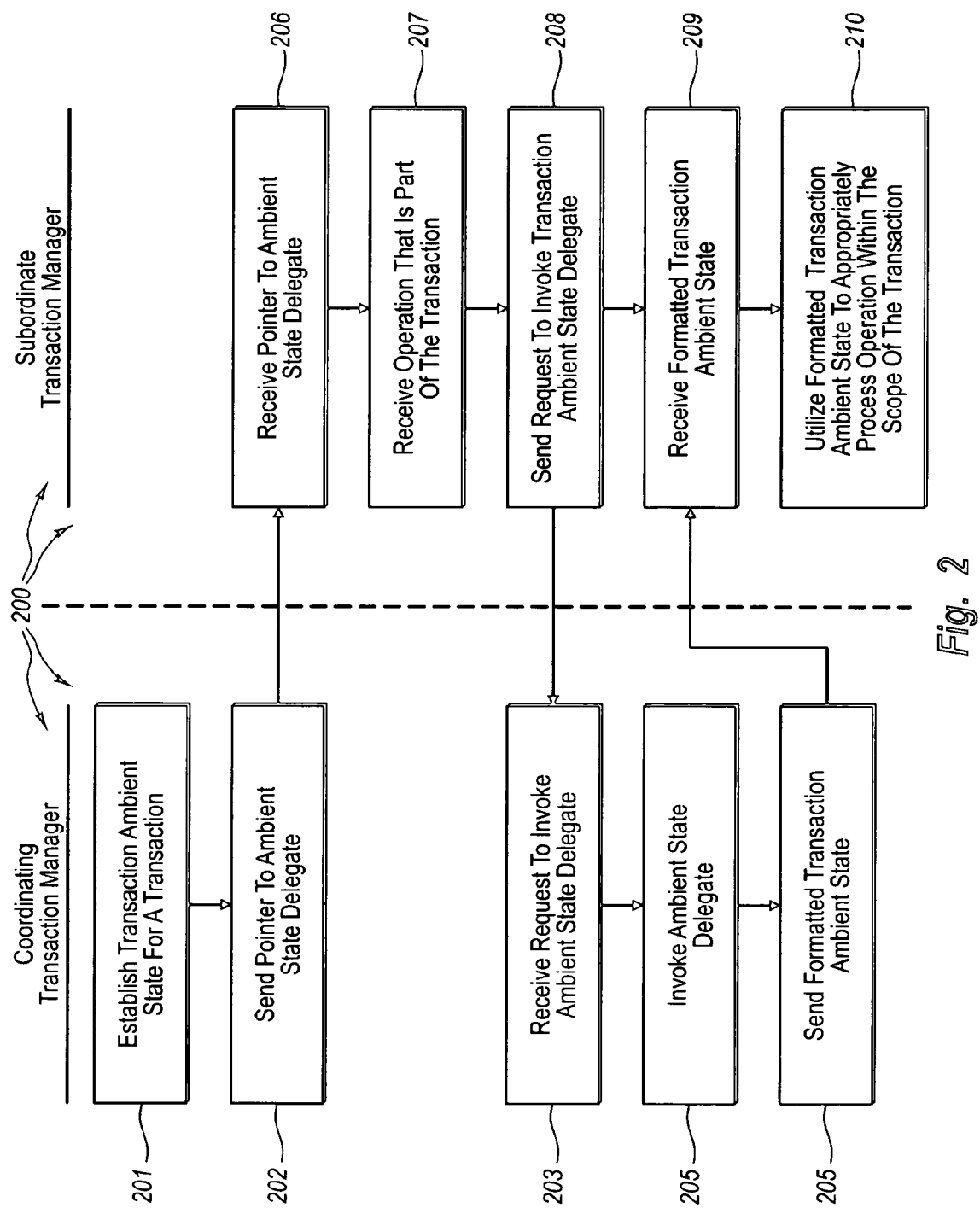
FIG. 2 illustrates an example flow chart of a method for synchronizing ambient state among multiple transaction managers.

FIG. 2 illustrates an example flow chart of a method 200 for synchronizing ambient state among multiple transaction managers. Method 200 will be described with respect to the components and data depicted in computer architecture 100.

Method 200 includes an act of establishing transaction ambient state for a transaction (act 201). For example, coordinating transaction manager 103 can establish ambient state for transaction 111, in response to receiving transaction 111. Transaction 111 can be initiated by application 101 and can include one or more operations that are delimited by a transaction start and a transaction end. The delimited transaction start and a transaction end can be in a format that is compatible with coordinating transaction manager 103.

Method 200 includes an act of sending a pointer to an ambient state delegate (act 202). For example, coordinating transaction manager 103 can send call back pointer 114 to subordinate transaction manager 104. Call back pointer 114 can be an address to ambient state delegate 131 that subordinate transaction manager 104 can call to request transaction ambient state for transaction 111. Ambient state delegate 131 is configured to provide transaction ambient state to subordinate transaction managers in a format that is compatible with the subordinate transaction managers. For example, ambient state delegate 131 can include an API that indicates how transaction 111 is delimited (transaction start and transaction end) in a format compatible with subordinate transaction manager 104. Accordingly, application 101 is relieved from having to provide transaction ambient state for transaction 111 to subordinate transaction manager 104.

Method 200 includes an act of receiving a pointer to an ambient state delegate (act 206). For example, subordinate transaction manager 104 can receive call back pointer 114 from coordinating transaction manager 103. Method 200 includes an act of receiving an operation that is part of the transaction (act 207). For example, subordinate transaction manager 104 can receive operation 112B that is part of transaction 111.

Method 200 includes an act of sending a request to invoke the transaction ambient state delegate (act 208). For example, subordinate transaction manager 104 can send call back 116 to coordinating transaction manager 103 in response to receiving operation 111. Call back 116 can be a call to the address of call back pointer 114 and can be a call to an API included in ambient state delegate 131.

Method 200 includes an act of receiving a request to invoke the ambient state delegate (act 203). For example, coordinating transaction manager 103 can receive call back 116 from subordinate transaction manager 104. Method 200 includes an act of invoking the ambient state delegate (act 204). For example, coordinating transaction manager 103 can invoke ambient state delegate 131 to format the transaction ambient state of transaction 111 for subordinate transaction manager 104. Invocation of ambient state delegate 131 can include calling an API configured to provide transaction ambient state, such as, for example, ambient state 117, in a format compatible with subordinate transaction manager 104. For example, an API can be configured to delimit the boundaries of transaction 111 in a format compatible with subordinate transaction manager 104.

Method 200 includes an act of sending formatted transaction ambient state (act 205). For example, coordinating transaction manager 103 can send ambient state 117 to subordinate transaction manager 104. Method 200 includes an act of receiving formatted transaction ambient state (act 209). For example, subordinate transaction manager 104 can receive ambient state 117 from coordinating transaction manager 103. Method 200 includes an act of utilizing the formatted transaction ambient state to appropriately process the operation within the scope of the transaction (act 210). For example, subordinate transaction manager 104 can utilize ambient state 117 to appropriately process operation 112B within the scope of the transaction 111.

Accordingly, embodiments of the present invention can be implemented in environments having transactions distributed across multiple transaction managers, to synchronize transaction ambient state among the multiple transaction managers. Thus, it may be that a superior transaction manager establishes a transaction context for a transaction and a subordinate more specialized transaction manager (e.g., for a file system, database, etc.) implements an operation of the transaction. The following is a code example of source code that (e.g., after compilation) can be executed in a distributed transaction manager environment, such as, for example, transaction manager federation 121:

1. using (TransactionScope s=new TransactionScope ( ))
2. {
3. CreateFileTransacted ("FILENAME");
4. 
5. s.Complete ( );
6. }

In the code example, lines 1, 2, 5, and 6 represent communication with the superior transaction manager (e.g., coordinating transaction manager 103). Line 1 more specifically represents establishment of a transaction. Lines 2 and 6 set the bounds of the transaction. Line 5 indicates that the transaction was successfully committed (or aborted).

Line 3 represents communication with a specialized file system resource manager, for example, local resource manager 102, that is aware of a corresponding specialized file system transaction manager (e.g., subordinate transaction manager 104) but that is unaware of the superior transaction manager. Accordingly, the superior transaction manager and the specialized file system transaction manager can implement a protocol that allows the superior transaction manager to establish the specialized file system transaction manager as a subordinate transaction manager. The protocol is unknown to an application that executes the source code and to the specialized resource manager.

Thus at line 3, the specialized file system transaction manager calls back to the superior transaction manager to get the transaction ambient state for the transaction established at line 1. The specialized file system transaction manager can also be stitched into a commit tree for the established transaction. Inside line 3 the file operation is implemented. After the file operation is complete, the specialized file system transaction manager notifies the superior transaction manager.

Figure 3:
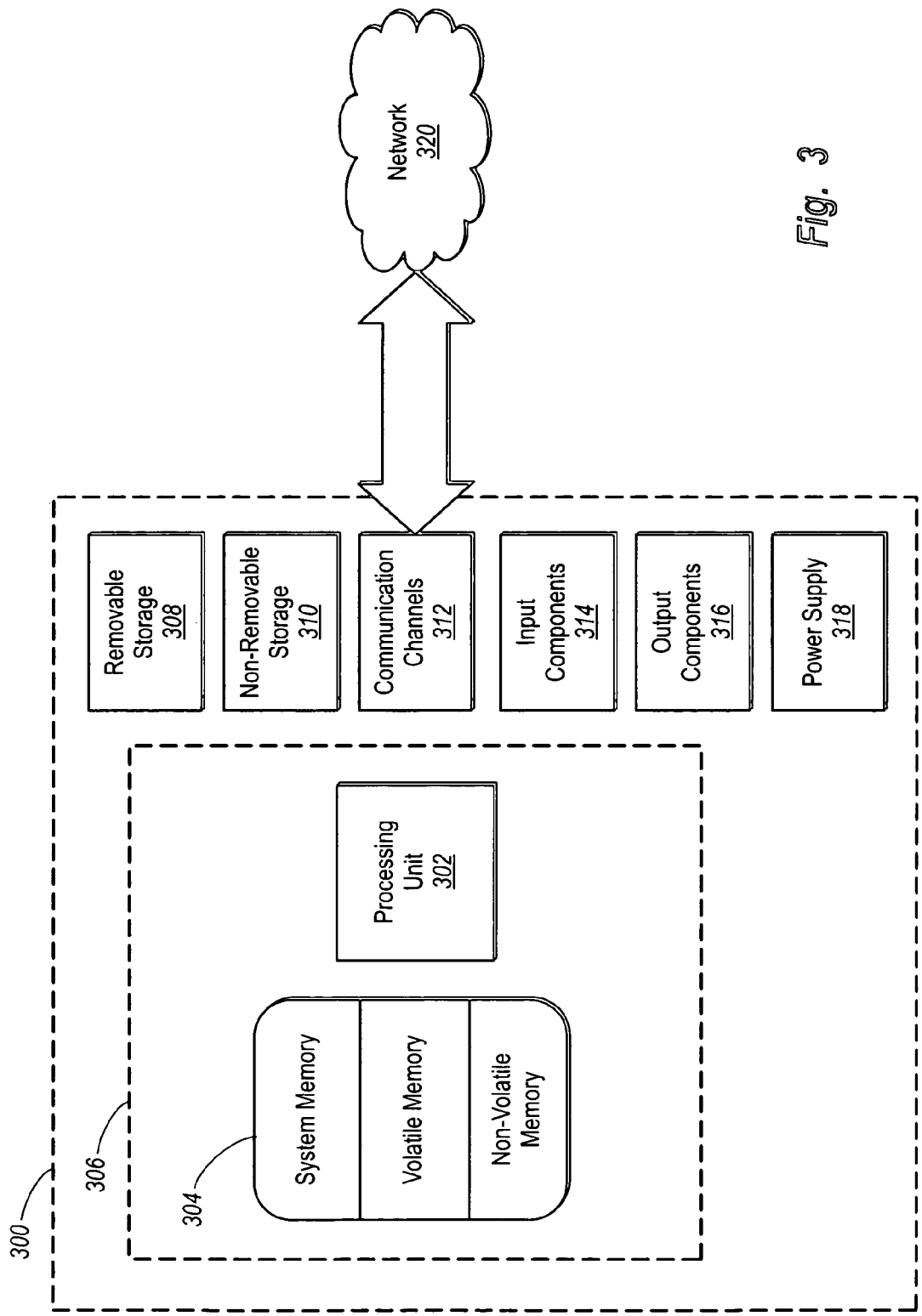
FIG. 3 illustrates a suitable operating environment for the principles of the present invention.

FIG. 3 illustrates a suitable operating environment for the principles of the present invention. FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

FIG. 3 depicts a schematic diagram of a computer system 300. For descriptive purposes, the depicted computer system is only one example of a suitable environment and is not intended to suggest any limitation as to the scope of use or functionality of the invention. Neither should the computer systems be interpreted as having any dependency nor requirement relating to any one or combination of components illustrated in FIG. 3.

In some basic configurations, computer system 300 includes at least one processing unit 302 and memory 304. The memory 304 may be volatile (such as RAM), non-volatile (such as ROM, flash memory, etc.), or some combination of the two. One basic configuration is illustrated in FIG. 3 by the dashed line 306.

Included storage media devices may have additional features and functionality. For example, they may include additional storage (removable and non-removable) including, but not limited to, PCMCIA cards, magnetic and optical disks, and magnetic tape. Such additional storage is illustrated in FIG. 3 by removable storage 308 and non-removable storage 310. Computer-storage media include volatile and non-volatile, removable and non-removable media implemented in any method or technology for storage of information such as computer-readable instructions, data structures, program modules, or other data. Memory 304, removable storage 308, and non-removable storage 310 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computer system.

Computer system 300 may also contain communication channels 312 that allow the host to communicate with other systems and devices over a network 320. Communication channels 312 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computer system 300 may also have input components 314 such as a keyboard, mouse, pen, a voice-input component, a touch-input device, and so forth. Output components 316 include screen displays, speakers, printer, etc., and rendering modules (often called "adapters") for driving them. The computer system 300 has a power supply 318. All these components are well known in the art and need not be discussed at length here.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

In accordance with the present invention, modules including applications, resource managers, and transaction managers, as well as associated data, including transactions, transaction scopes, transaction ambient state, operations, call back pointers, and call backs can be stored and accessed from any of the computer-readable media associated with computer system 300. When a mass storage device, such as, for example, non-removable storage 310, is coupled to computer system 300, such modules and associated program data may also be stored in the mass storage device. In a networked environment, program modules depicted relative to computer system 300, or portions thereof, can be stored in remote memory storage devices, such as, system memory and/or mass storage devices associated with remote computer systems. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system including a coordinating transaction manager that implements transaction based processing, a method for synchronizing transaction ambient state with a subordinate transaction manager, the method comprising:

an act of establishing transaction ambient state for an application initiated transaction, the transaction ambient state being in a format that is compatible with the manager;

an act of sending a pointer to an ambient state delegate to the subordinate transaction manager, the ambient state delegate for providing the transaction ambient state in a format that is compatible with the subordinate transaction manager such that the application is relieved from having to provide transaction ambient state to the subordinate transaction manager;

an act of receiving a request to invoke the ambient state delegate from the subordinate transaction manager, the request sent from the subordinate transaction manager in response to the subordinate transaction manager receiving an operation that is part of the transaction;

an act of invoking the ambient state delegate to format the transaction ambient state for the subordinate transaction manager; and an act of sending the formatted transaction ambient state to the subordinate transaction manager such that the subordinate transaction manager can appropriately process the operation within a scope of the transaction.

2. The method as recited in claim 1, further comprising:

an act of the coordinating transaction manager identifying the existence of the subordinate transaction manager; and an act of the coordinating transaction manager registering with the subordinate transaction manager as a possible superior transaction manager for the subordinate transaction manager.

3. The method as recited in claim 1, wherein the act of establishing transaction ambient state for an application initiated transaction comprises an act of setting the transaction boundaries.

4. The method as recited in claim 1, wherein the act of setting the transaction boundaries comprises an act of delimiting the start and end of the transaction.

5. The method as recited in claim 1, wherein the act of sending a pointer to an ambient state delegate to the subordinate transaction manager comprises an act of sending a pointer to an Application Program Interface at the coordinating transaction manager to the subordinate transaction manager.

6. The method as recited in claim 1, wherein the act of invoking the ambient state delegate to format the transaction ambient state for the subordinate transaction manager comprises an act of calling an Application Program Interface, the Application Program Interface having internal logic for formatting the transaction ambient state for compatibility with subordinate transaction managers.

7. The method as recited in claim 6, further comprising:
an act of invoking the internal logic to delimit the beginning and end of the transaction in a format that is compatible with the subordinate transaction manager.

8. At a computer system including a subordinate transaction manager that implements transaction based processing for an application, a method for synchronizing transaction ambient state with a coordinating transaction manager, the method comprising:
an act of receiving a pointer to an ambient state delegate from the coordinating transaction manager, the ambient state delegate configured to provide established transaction ambient state to the subordinate transaction manager in a format that is compatible with the subordinate transaction manager such that the application is relieved from having to provide transaction ambient state directly to the subordinate transaction manager, the established transaction ambient state established at the coordinating transaction manager for a transaction initiated at the application;
an act of receiving an operation that is part of the transaction;
an act of sending a request to invoke the ambient state delegate to the coordinating transaction manager in response to receiving the operation;
an act of receiving formatted transaction ambient state from the ambient state delegate, the formatted transaction ambient state in a format that is compatible with the subordinate transaction manager; and
an act of utilizing the formatted transaction ambient state to appropriately process the operation within a scope of the transaction.

9. The method as recited in claim 8, further comprising:
an act of the subordinate transaction manager identifying the coordinating transaction manager; and
an act of the coordinating transaction manager registering with the subordinate transaction manager as a possible superior transaction manager for the subordinate transaction manager.

10. The method as recited in claim 8, wherein the act of receiving a pointer to an ambient state delegate from the coordinating transaction manager comprises an act of receiving a pointer to an Application Program Interface from the coordinating transaction manager.

11. The method as recited in claim 10, wherein the act of receiving a pointer to an Application Program Interface from the coordinating transaction manager comprises an act of receiving a pointer to an Application Program Interface that includes internal logic for delimiting the beginning and end of the transaction in a format that is compatible with the subordinate transaction manager.

12. The method as recited in claim 8, wherein the act of receiving an operation that is part of the transaction comprises an act of receiving a file operation.

13. The method as recited in claim 8, wherein the act of sending a request to invoke the ambient state delegate to the coordinating transaction manager in response to receiving the operation comprises an act of sending a request to invoke the ambient state delegate to the coordinating transaction manager.

14. The method as recited in claim 8, wherein the act of sending a request to invoke the ambient state delegate to the coordinating transaction manager in response to receiving the operation comprises an act of sending a request to invoke the ambient state delegate to an address represented by the pointer.

15. The method as recited in claim 8, wherein the act of sending a request to invoke the ambient state delegate to the coordinating transaction manager in response to receiving the operation comprises an act of sending a request to invoke the ambient state delegate to an Application Program Interface that includes internal logic for delimiting the transaction in format compatible with the subordinate transaction manager.

16. The method as recited in claim 8, wherein the act of receiving formatted transaction ambient state from the ambient state delegate comprises an act of receiving transaction ambient state delimiting the beginning and end of the transaction in a format that is compatible with the subordinate transaction manager.

17. The method as recited in claim 8, wherein the act of utilizing the formatted transaction ambient state to appropriately process the operation within a scope of the transaction comprises an act of utilizing the formatted transaction ambient state to appropriately process a file operation.

18. A computer system comprising:
system memory;
one or more processors; and
one or more computer readable media having stored thereon a coordinating transaction manager and a subordinate transaction manager, the coordinating transaction manager being configured to:
establish transaction ambient state for an application initiated transaction, the transaction ambient state being in a format that is compatible with the coordinating transaction manager;
send a pointer to an ambient state delegate to the subordinate transaction manager, the ambient state delegate for providing the transaction ambient state in a format that is compatible with the subordinate transaction manager such that the application is relieved from having to provide transaction ambient state to the subordinate transaction manager;
receive a request to invoke the ambient state delegate from the subordinate transaction manager, the request sent from the subordinate transaction manager in response to the subordinate transaction manager receiving an operation that is part of the transaction;

invoke the ambient state delegate to format the transaction ambient state for the subordinate transaction manager; and send the formatted transaction ambient state to the subordinate transaction manager such that the subordinate transaction manager can appropriately process the operation within a scope of the transaction; and the subordinate transaction manager being configured to:

receive a pointer to an ambient state delegate at coordinating transaction manager, the ambient state delegate configured to provide established transaction ambient state to the subordinate transaction manager in a format that is compatible with the subordinate transaction manager such that the application is relieved from having to provide transaction ambient state directly to the subordinate transaction manager, the established transaction ambient state established at the coordinating transaction manager for an application initiated transaction;

receive an operation that is part of the transaction;

send a request to invoke the ambient state delegate to the coordinating transaction manager in response to receiving the operation;

receive formatted transaction ambient state from the ambient state delegate, the formatted transaction ambient state in a format that is compatible with the subordinate transaction manager; and utilize the formatted transaction ambient state to appropriately process the operation within the scope of the transaction.

19. The system of claim 18, wherein the coordinating transaction manager is further configured to:

identify the existence of the subordinate transaction manager; and register with the subordinate transaction manager as a possible superior transaction manager for the subordinate transaction manager; and wherein the subordinate transaction manager is further configured to:

be identified by the coordinating transaction manager; and accept a registration from the coordinating transaction manager as a possible superior transaction manager for the subordinate transaction manager.

* * * * *